Nov. 4, 1952 S. T. SLEZAK 2,616,979

AUDIBLE ALARM FOR TELEPHONE SYSTEMS

Filed March 17, 1949 2 SHEETS—SHEET 1

INVENTOR
S. T. SLEZAK
BY
R. O. Cowell
ATTORNEY

Nov. 4, 1952 S. T. SLEZAK 2,616,979

AUDIBLE ALARM FOR TELEPHONE SYSTEMS

Filed March 17, 1949 2 SHEETS—SHEET 2

INVENTOR
S. T. SLEZAK

BY R. O. Covell
ATTORNEY

Patented Nov. 4, 1952 2,616,979

UNITED STATES PATENT OFFICE 2,616,979

AUDIBLE ALARM FOR TELEPHONE SYSTEMS

Stanley T. Slezak, Flushing, N. Y., assignor to Bell Telephone Laboratories, Incorporated, New York, N. Y., a corporation of New York Application March 17, 1949, Serial No. 81,969

10 Claims. (Cl. 179—18)

Figures 1A, 1B, 1C, 1D:
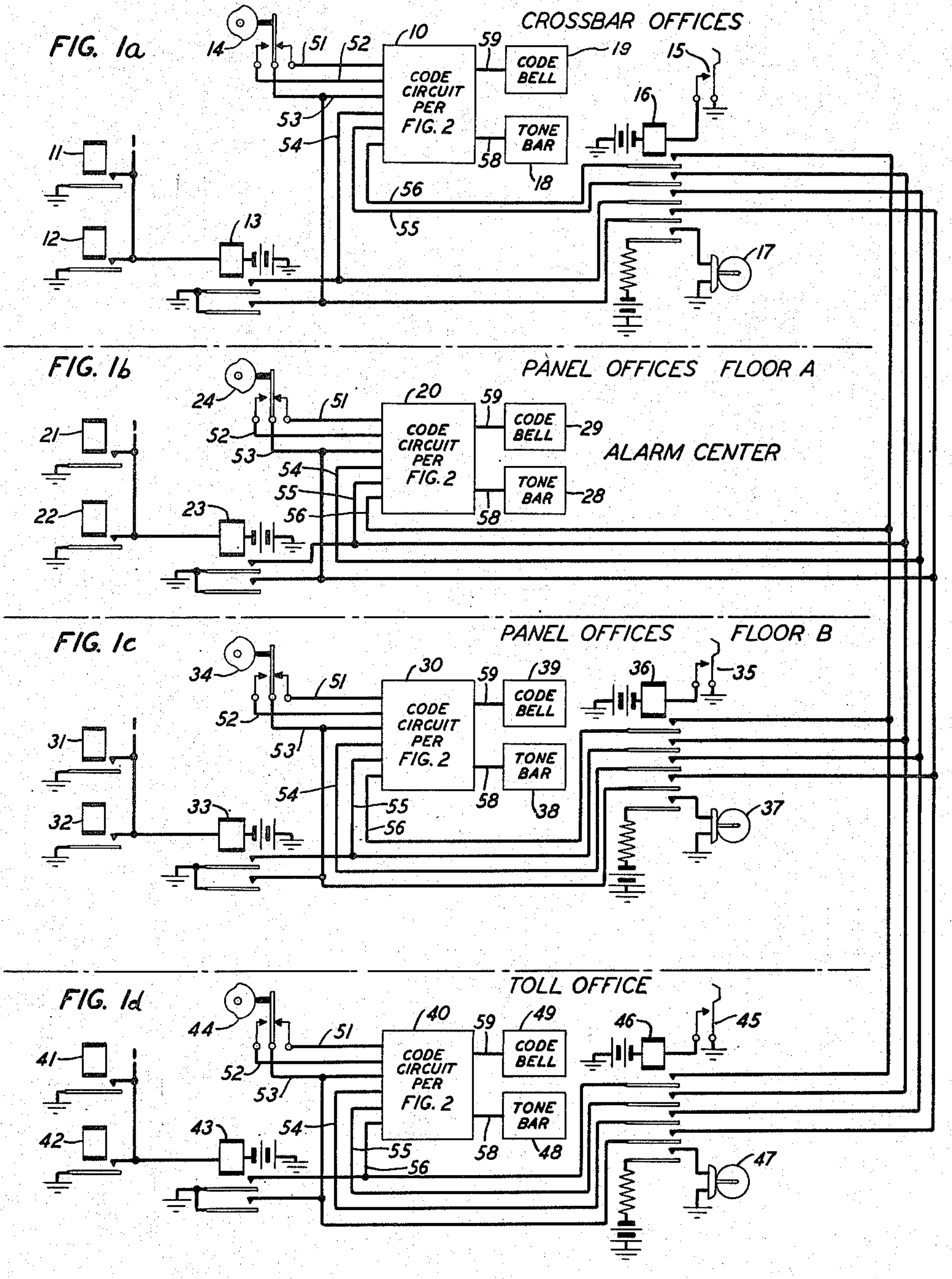

This invention relates to alarm signaling systems and particularly to selective alarm signaling for indicating trouble conditions occurring in the switching equipment of telephone offices.

Objects of the invention are the improvement of maintenance arrangements provided in telephone systems and the giving of distinctive trouble alarms in telephone office buildings which house different types of equipment on the same or different floors.

In most telephone offices it is usual to provide miscellaneous alarm apparatus which becomes effective when any one of a variety of trouble conditions occurs and this apparatus is arranged to give minor alarms or major alarms depending on the nature and seriousness of the trouble. This miscellaneous alarm apparatus includes both visual and audible signals. The audible signals may include buzzers or bells and may include a tone bar which is repeatedly sounded while a major alarm condition exists. The visual signals include floor lamps, aisle pilot lamps and frame lamps to aid the maintenance man in locating the trouble which is causing the alarm; and the alarm signals terminate when the trouble is cleared.

When a plurality of types of office equipments are provided, the maintenance force is usually divided into groups, each group familiar with, and skilled in clearing trouble conditions in, a particular type of equipment. At times when there are maintenance men on duty for each type of equipment and for each floor of office equipment of the same type, the trouble alarm signal may be given only on the floor or area in which the particular office equipment or type of equipment is located. At other times, the entire maintenance force may be stationed at one of the alarm locations, for instance when there is only one man for each type of equipment or a single man for all equipments; and, in such a case, it is desirable that alarms for all types of equipments be given at all alarm apparatus locations.

This invention is a system of trouble alarm signaling particularly adapted for use in telephone office buildings which house different types of equipment and different members of the maintenance force are assigned to maintain each different kind of equipment. According to the invention, a tone bar and code bell and a code alarm circuit are provided at each of a plurality of locations in a building housing telephone office equipment for giving an audible alarm indicative of the type of equipment with which the alarm circuit is associated when a trouble alarm condition exists therein, and for repeating the signal at intervals until the trouble condition is cleared. A feature of the invention is an arrangement whereby the trouble alarm apparatus associated with each different type of telephone office equipment and with each location of the same type of equipment may be switched together; so that a trouble alarm code will be sounded at all of the alarm apparatus locations whenever a trouble condition exists in the corresponding type of equipment, the codes for all types of equipment in which trouble conditions simultaneously exist being sounded in succession and cyclically repeated at predetermined intervals.

The signaling system shown schematically in the accompanying drawings embodies the invention and its features; and a clear and complete understanding of the invention will be facilitated by describing this system. The invention is not limited in its application to telephone office equipment or to equipments of the specific types or number of types shown in the drawing but is generally applicable to any signaling system involving selective coded supervisory signaling.

Figure 2:
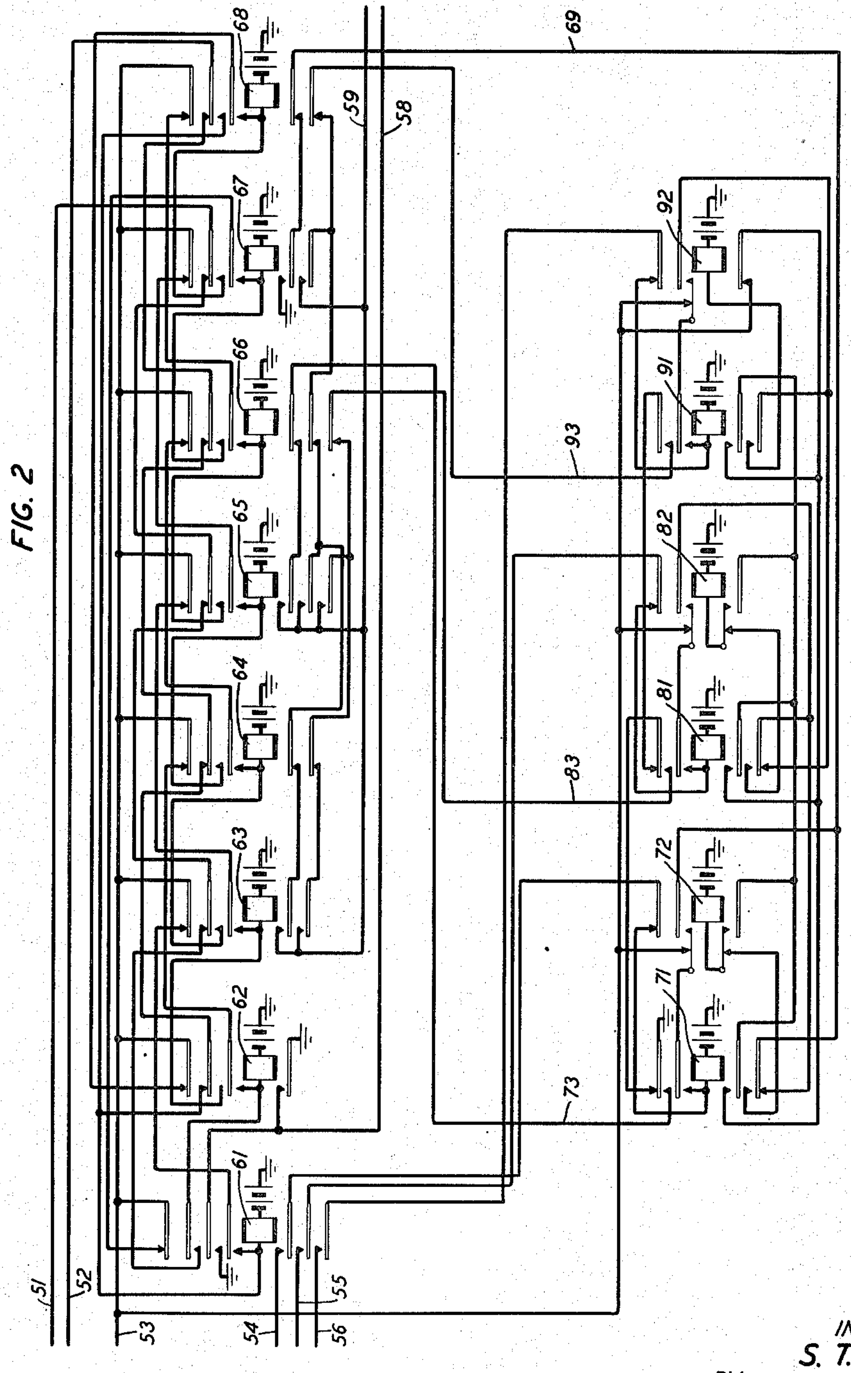

Referring to the drawings:

Figs. 1*a*, 1*b*, 1*c* and 1*d* show an audible alarm signaling system associated with telephone office equipment, the alarm apparatus of Fig. 1*a* being associated with one or more cross-bar office units, the alarm apparatus of Figs. 1*b* and 1*c* being associated with panel office equipments, and the alarm apparatus of Fig. 1*d* being associated with toll office equipment; and Fig. 2 shows in detail the alarm code circuit which is included in the alarm apparatus of each of Figs. 1*a*, 1*b*, 1*c* and 1*d*.

The alarm system shown in the drawing is arranged for three different alarm codes, code 1 for the cross-bar office equipment, code 2 for the panel office equipments and code 3 for the toll office equipment. Since panel equipments are shown on two floors, there is an alarm apparatus provided for each floor. Alarm apparatus for each equipment includes the usual alarm relays which are operated when a major trouble condition arises, these relays being represented in Fig. 1*a* by relays 11 and 12, in Fig. 1*b* by relays 21 and 22, in Fig. 1*c* by relays 31 and 32 and in Fig. 1*d* by relays 41 and 42. Reference may be had to the patent to J. N. Walters 2,262,595 granted November 11, 1941, for a general description of miscellaneous alarm equipment usually provided in a telephone office of the step-by-step type. In addition to the usual alarm apparatus represented by the relays 11, 21, 31 and 41, there is provided for each of the cross-bar, panel and toll equipments, a code circuit 10, 20, 30 or 40, a tone bar 18, 28, 38 or 48 and a code bell 19, 29, 39 or 49. Each of the code circuits 10, 20, 30 and 40 is similar, and one such code circuit is shown in detail in Fig. 2. Each of the code circuits 10, 20, 30 and 40 has associated therewith an interrupter 14, 24, 34 or 44 and a control relay 13, 23, 33 or 43 which is controlled by the alarm relays of the associated equipment. The tone bars 18, 28, 38 and 48, one for each of the four equipments, may be a part of the regular miscellaneous alarm equipment provided for giving audible alarms. Each code bell is a direct-current controlled bell of the single stroke type and the various alarm codes for the different types of equipment constitute a stroke on the tone bar followed by either one stroke, two strokes or three strokes on the code bell. A key 35 and alarm switching relay 36 are provided in the alarm apparatus associated with the panel office equipment on floor B for switching the code circuit 30 into connection with the code circuit 20 of the alarm apparatus associated with the panel equipment on floor A; whereby a trouble condition in the panel equipment of either floor will cause the alarm code for panel equipment to be sounded on both floors. A like key 15 and switching relay 16 is associated with the alarm apparatus for the cross-bar equipment, and a key 45 and switching relay 46 is associated with the toll office equipment; whereby the code circuits 10 and 40 may likewise be connected with code circuit 20 in order that all alarm codes for all the different types of equipment will be sounded by the tone bar and code bell associated with alarm apparatus of each of the different equipments as hereinafter described in detail.

The alarm code circuit shown in Fig. 2 comprises a group of relays 61 to 68 which are cylically operated to repeatedly sound one or more of the alarm codes depending upon the type or types of equipment in which a trouble condition exists and a set of two relays for each different type of equipment, relays 71 and 72 for the cross-bar office equipment, relays 81 and 82 for the panel office equipments and relays 91 and 92 for the toll office equipment.

Assume now that a trouble condition occurs in the cross-bar office equipment which causes the operation of one or the other or both of relays 11 and 12 of the miscellaneous alarm apparatus. The operation of relay 11 or 12 closes a circuit for operating relay 13; and the operation of relay 13 connects ground to each of conductors 53 and 54 of code circuit 10. The associated interrupter 14 is of the continuously operating reciprocating type which alternately connects conductor 53 to each of conductors 51 and 52 once every half second. As soon after the operation of relay 13 as interrupter 14 next connects ground to conductor 52, a circuit is closed through a back contact of each of relays 68, 66, 64 and 62 in the order named for operatively energizing the winding of relay 61 of code circuit 10. Relay 61 closes a locking circuit to conductor 53 which circuit includes a back contact of relay 63; connects ground to conductor 58 to actuate the tone bar 18 and thereby give an audible indication that a trouble condition exists; and closes a circuit from grounded conductor 54 through a front contact of relay 61 and a back contact of relay 72 for operatively energizing the winding of relay 71. Relay 71 locks through a back contact of relay 72 to the grounded conductor 53 and connects ground to conductor 73. As soon after relay 61 operates as interrupter 14 connects ground to conductor 51, a circuit which includes a back contact of each of relays 67, 65 and 63 and a front contact of relay 61 is closed for operatively energizing the winding of relay 62. Relay 62 locks through a back contact of relay 64 to conductor 53; connects ground to conductor 58, to which ground is already connected at a front contact of relay 61; and connects the winding of relay 63 through back contacts of relays 64, 66 and 68 to conductor 52. When interrupter 14 next connects ground to conductor 52, relay 63 operates and is locked operated through a back contact of relay 65 to conductor 53. The operation of relay 63 opens the locking circuit of relay 61 and connects the winding of relay 64 through back contacts of relays 65 and 67 to conductor 51. Relay 61 releases; and, when interrupter 14 next connects ground to conductor 51, relay 64 operates and is locked operated through a back contact of relay 66 to conductor 53. The operation of relay 64 opens the locking circuit of relay 62 and connects the winding of relay 65 through back contacts of relays 66 and 68 to conductor 52. Relay 62 releases thereby causing the deenergization of the tone bar 18; and when interrupter 14 next connects ground to conductor 52, relay 65 operates and is locked operated through a back contact of relay 67 to conductor 53. The operation of relay 65 opens the locking circuit of relay 63; connects the winding of relay 66 through a back contact of relay 67 to conductor 51; and closes a circuit from grounded conductor 73 through a back contact of relay 66, a front contact of relay 65 and conductor 59 for operatively energizing the code bell 18, whereby there is one stroke of the code bell to indicate that the trouble which caused the preceding operation of the tone bar is a trouble in the cross-bar equipment. Relay 63 releases; and, when interrupter 14 next connects ground to conductor 51, relay 66 operates and is locked operated through a back contact of relay 68 to conductor 63. The operation of relay 66 opens the locking circuit of relay 64; opens the connection between conductors 73 and 59, thereby deenergizing the code bell 18; and connects the winding of relay 67, through a back contact of relay 68, to conductor 52. Relay 64 releases; and, when the interrupter 14 next connects ground to conductor 52, relay 67 operates and is locked through a back contact of relay 61 to conductor 53. The operation of relay 67 opens the locking circuit of relay 65; connects the winding of relay 68 to conductor 51; and closes a circuit which includes a back contact of relay 68, conductor 69 and a front contact of relay 71 for operatively energizing the winding of relay 72. Relay 65 releases, and relay 72 operates and is locked operated through a front contact of relay 71 and a back contact of relay 92 to conductor 53. The operation of relay 72 opens both the aforementioned operating and locking circuits of relay 71 but closes another locking circuit for relay 71 through conductor 69 until relay 68 is operated. When interrupter 14 next connects ground to conductor 51, relay 68 operates and is locked operated through a back contact of relay 62 to conductor 53. The operation of relay 68 causes the release of relays 66 and 71 and connects the winding of relay 61 to conductor 52. The release of relay 71 causes the release of relay 72, thus ending one cycle of the operation of relays 61 to 68. The release of relays 71 and 72 prepares for a recheck of the existence of a trouble condition as evidenced by ground potential on conductor 54. As soon thereafter as interrupter 14 again connects ground to conductor 52, relay 61 reoperates beginning a new cycle of operation of relays 61 to 68. The reoperation of relay 61 causes the release of relay 67, reconnects the winding of relay 62 to conductor 51, connects ground to conductor 58 to cause another stroke on the tone bar 18, and again closes the circuit for operating relay 71. When interrupter 14 next connects ground to conductor 51, relay 62 is reoperated and locked to conductor 53 and relay 68 is released. The second cycle of operation of relays 61 to 68 is completed in the manner hereinbefore described; and these relays continue to be operated and released in the above-described order and manner to cyclically cause one stroke on the tone bar 18 followed by one stroke on the code bell 19 until the trouble is cleared whereupon the operated miscellaneous alarm relay 11 releases followed by the release of relay 13. When relay 13 releases, ground is disconnected from conductors 53 and 54 and all of the relays in the code circuit 10 are restored to normal.

When a trouble condition arises in the panel equipment on floor A, the operation of a miscellaneous alarm relay 21 or 22 causes the operation of relay 23; and the operation of relay 23 connects ground to conductors 53 and 55 of code circuit 20, thereby causing the relays 61 to 68 of this code circuit to operate in the manner above described for code circuit 10. Since ground is connected to conductor 55 instead of to conductor 54, relay 81 is operated instead of relay 71; and the operation of relay 81 connects ground through a back contact of relay 71 to conductor 83. When relay 61 operates, it causes one stroke on the tone bar 28; when relay 63 operates it causes a first stroke of the code bell 29, and when relay 65 operates it causes a second stroke on the code bell 29. When relay 67 operates, relay 82 is operated; and, at the end of the cycle of operation of relays 61 to 68, relays 81 and 82 are released to enable a check of the continued existence of trouble on floor A when relay 61 reoperates. The alarm code consisting of a stroke on the tone bar 28 followed by two strokes on the code bell 29 continues to be sounded until the trouble on floor A has been cleared and relays 21, 22 and 23 are released.

When a trouble condition arises in the panel equipment on floor B, the operation of the alarm relay 31 or 32 causes the operation of relay 33; and the operation of relay 33 connects ground to conductors 53 and 55 of code circuit 30 which thereupon operates in identical manner to that in which code circuit 20 is operated as above described to cyclically sound the tone bar 38 followed by two strokes on the code bell 39. If the key 35 is operated, relay 36 operates to individually connect each of conductors 53, 54, 55 and 56 of code circuit 30 to the corresponding conductors of code circuit 20; so that both of these code circuits will be operated responsive to a trouble condition on either or both of floors A and B to sound the audible alarm and code for panel equipment on both floors, the usual floor pilot lamps (not shown) being effective to inform the maintenance man whether a trouble condition exists on floor A or floor B or on both floors. When the trouble has been cleared and relays 23 and 33 have both released, the code circuits 20 and 30 are restored to normal.

When a trouble condition occurs in the toll office equipment, an alarm relay 41 or 42 causes the operation of relay 43; and the operation of relay 43 connects ground to conductors 53 and 56, thereby causing the operation of code relays 61 to 68 of code circuit 40 in the manner above described for code circuit 10. Since ground is connected to conductor 56 instead of conductor 54, relay 91 is operated instead of relay 71; and the operation of relay 91 connects ground to conductor 93. When relay 61 operates, it causes one stroke on the tone bar 48; when relay 63 operates it causes a first stroke of the code bell 49; when relay 65 operates it causes a second stroke of the code bell 49; and when relay 67 operates it causes a third stroke of the code bell 49 and causes the operation of relay 92. At the end of the cycle of operations of relays 61 to 68, relays 91 and 92 are released, to enable a check of the continued existence of trouble in the toll office equipment when relay 61 reoperates. The alarm code consisting of a stroke on the tone bar 48 followed by three strokes of the tone bar 49 continues to be sounded until the trouble in the toll office equipment has been cleared and relays 41, 42 and 43 are released.

Assume now that keys 15, 35 and 45 have all been operated in order that all major alarm signals will be given in all alarm locations. Relays 16, 36 and 46 operate to interconnect the corresponding conductors 53, 54, 55 and 56 of code circuits 10, 20, 30 and 40. Whenever a trouble condition occurs in one or more of the four equipments, one or more of relays 13, 23, 33 and 43 are operated, thereby connecting ground to conductor 53 of all four code circuits and connecting ground to each of conductors 54, 55 and 56 of all four code circuits which identifies the type of equipment in which trouble exists. If relay 13 alone is operated, all of the code circuits operate as above described for code circuit 10 to sound the alarm code for cross-bar equipment on all tone bars and code bells; if relay 23 or 33 is operated or if both of these relays are operated, all of the code circuits operate as above described to sound the alarm code for panel equipment on all tone bars and code bells; and if relay 43 alone is operated, all of the code circuits operate to sound the alarm code for toll office equipment on all tone bars and code bells. If a trouble exists in more than one of the different types of equipment at one time, all of the code circuits are operated to sound in sequence the corresponding alarm codes identifying the types of equipment in which trouble exists; and as soon as the trouble is cleared in a particular type of equipment to terminate the sounding of the corresponding code but continue the cyclic sounding of the other codes corresponding to types of equipment in which troubles continues to exist. If, for instance, relays 13, 23 and 43 are operated, the operation of each of the code circuits 10, 20, 30 and 40 will be similar except that each is controlled by its own interrupter 14, 24, 34 or 44. The operations of code circuit 10 at such a time will be described. With ground connected to conductors 53, 54, 55 and 56, the next connection of ground to conductor 52 by interrupter 14 causes the operation of relay 61. The operation of relay 61 causes a stroke on the tone bar 18 and closes circuits for operating each of relays 71, 81 and 91. The operation of relay 65 connects ground to conductor 59 to cause one stroke on code bell 19; but since relay 71 operated, the operation of each of relays 63 and 67 does not connect ground to conductor 59, so that the first code sounded is the alarm code for trouble in the cross-bar office equipment. The operation of relays 61 connects ground to conductor 69, operating relay 72. Relay 72 locks through front contacts of relays 71, 81 and 91 in parallel and a back contact of relay 92 to conductor 53. When relay 68 operates, relay 71 releases but relays 72, 81 and 91 remain operated, being locked to conductor 53, and when relay 61 reoperates to begin a second cycle of the operation of relays 61 to 68, relay 71 cannot reoperate. The second cycle operation of relay 61 causes a stroke on tone bar 18; the operation of relay 63 causes a first stroke on code bell 19 and the operation of relay 65 causes a second stroke on code bell 19; but, with relay 81 operated, the operation of relay 67 does not connect ground to conductor 59 so that the alarm code sounded on the second cycle of operation of relays 61 to 68 is the alarm code for trouble in the panel equipment. The second cycle operation of relay 67 connects ground to conductor 69, operating relay 82; and relay 82 locks through front contacts of relays 81 and 91 and a back contact of relay 92 to conductor 53. When relay 68 operates, relay 81 releases but relays 72, 82 and 91 remain operated, being locked to conductor 53, and when relay 61 reoperates to begin a third cycle of the operation of relays 61 to 68, neither of relays 71 or 81 can reoperate. The third cycle operation of relay 61 causes a stroke on the tone bar 18, the operation of relay 63 causes a first stroke on code bell 19, the operation of relay 65 causes a second stroke on code bell 19, and the operation of relay 67 causes a third stroke on code bell 19 thus sounding the alarm code for trouble in the toll office equipment. The third cycle operation of relay 67 also causes the operation of relay 92. When relay 68 operates, relay 91 releases; and the release of relay 91 causes the release of each of relays 72, 82 and 92. The code circuit is now normal, ready to begin a new cycle of operations and ready to check the condition of the different types of equipment to determine which codes are to be again sounded in rotation.

Assume now that when relay 61 reoperates, the trouble condition in the panel equipment has been cleared and relays 23 and 33 are both normal but that trouble continues to exist in the cross-bar and toll office equipment. In this event, the operation of relay 61 causes the reoperation of relays 71 and 91; and the alarm code for the cross-bar equipment is sounded by the first cycle of operation of relays 61 to 68. The operation of relay 67, causes the operation of relay 72; and the operation of relay 68 causes the release of relay 71. Relays 72 and 91 remain operated and on the next cycle of operations, the alarm code for the toll office equipment is sounded; the operation of relay 67 causes the operation of relay 92, the operation of relay 92 causes the release of relays 72 and 91; and the release of relay 91 causes the release of relay 92.

From the foregoing it is apparent that each time that all of relays 71, 81 and 91 are released, a check is made of the condition of the different types of equipment to determine which codes are to be sounded in rotation by the operation of relays 61 to 68; and when all troubles have been cleared, none of relays 13, 23, 33 and 43 will be operated and the cyclic operation of each of the interconnected code circuits 10, 20, 30 and 40 will cease.

Each of switching relays 16, 36 and 46 controls a floor lamp 17, 37 and 47 respectively for giving a visual indication that the code circuit of that equipment is combined with the code circuit 20 at the alarm center, which in the arrangement is on floor A.

What is claimed is:

1. In combination, a plurality of telephone switchboards, a plurality of alarm units, one for each switchboard, a plurality of alarm codes, a different code for each switchboard, audible alarm means for each alarm unit, control means in each of said alarm units comprising a series of relays operable to sound the alarm code of the switchboard to which the unit is individual while an alarm condition exists therein, and relay switching means for interconnecting the control means of all of said units thereby to effect the operation of all units to sound in succession the alarm code for each switchboard in which a trouble condition exists.

2. In combination, a plurality of telephone switchboards, a plurality of alarm units, one for each switchboard, a plurality of alarm codes, a different code for each switchboard, means in each of said alarm units comprising a series of relays operable to effect the sounding of any one of said alarm codes or the sounding of a plurality of said codes in succession, circuit control means individual to each of said alarm units for causing the operation of the unit to repeatedly sound the alarm code of the switchboard to which the unit is individual while a trouble condition exists therein, and means comprising a relay for interconnecting the control means of two of said alarm units thereby to operate both alarm units to repeatedly sound either one or both of the alarm codes in succession depending upon whether an alarm condition exists in the one or the other or both of the switchboards to which said two alarm units are individual.

3. In combination, a plurality of different types of switchboard equipment, alarm relays and alarm codes, a relay and a different alarm code for each type of equipment, and alarm apparatus individual to each equipment controlled by the alarm relay individual thereto, each alarm apparatus comprising a code bell, a tone bar, an interrupter, a series of relays operable in succession under the control of said interrupter for energizing said bell and tone bar, and a set of control relays corresponding to each type of switchboard equipment for rendering the operation of any one of said alarm relays and said series of relays effective to energize said bell and tone bar to sound the alarm code corresponding to the equipment to which the operated alarm relay is individual, each of said different codes consisting of one stroke of the tone bar followed by one or more strokes of the code bell.

4. In combination, a plurality of different types of switchboard equipment, alarm relays and alarm codes one of each for each type of equipment, alarm apparatus individual to each equipment controlled by the alarm relay individual thereto, each alarm apparatus comprising a code bell, a tone bar, an interrupter, a series of relays operable in succession under the control of said interrupter for energizing said bell and tone bar, and a set of control relays corresponding to each type of switchboard equipment for rendering the operation of any one of said alarm relays and said series of relays effective to energize said bell and tone bar to sound the alarm code corresponding to the equipment to which the operated alarm relay is individual, each of said different codes consisting of one stroke of the tone bar followed by one or more strokes of the code bell, and means including a relay effective to render the alarm apparatus of a particular equipment responsive only to the operation of the alarm relay individual to said particular equipment.

5. In combination, a plurality of different types of equipment, a plurality of alarm relays, each of said relays individual to a different type of equipment and each relay operated responsive to the existence of a trouble condition in the equipment to which the relay is individual and an alarm apparatus unit for sounding different alarm codes, a different code for each type of equipment, said alarm apparatus unit comprising an electromagnetically actuated tone bar, an electromagnetically actuated bell, an interrupter, a series of alarm coding relays operable in succession under the control of said interrupter while any one of said alarm relays is operated, and a set of code control relays for each different type of equipment, each said set operated whenever the alarm relay for the same type of equipment is operated for rendering the operation of said series of coding relays effective to operate said tone bar and bell to sound the alarm code which identifies any equipment the alarm relay of which is operated.

6. In combination, a plurality of different types of equipment, a plurality of alarm relays, each of said relays individual to a different type of equipment and each relay operated responsive to the existence of a trouble condition in the equipment to which the relay is individual and an alarm apparatus unit for sounding different alarm codes, a different code for each type of equipment, said alarm apparatus unit comprising an electromagnetically actuated tone bar, an electromagnetically actuated bell, an interrupter, a series of alarm coding relays operable in succession under the control of said interrupter while any one of said alarm relays is operated, and a series of sets of control relays, one set for each different type of equipment, each set comprising a first relay operated whenever the alarm relay of the same equipment is operated for conditioning said series of alarm coding relays for sounding the particular alarm code which identifies the equipment, and a second relay operated when the complete alarm code has been sounded for preventing the resounding of the same code until the corresponding alarm code has been sounded for each of the other equipments the alarm relay of which is operated.

7. In combination, a plurality of different types of equipment, a plurality of alarm relays, each of said relays individual to a different type of equipment and each relay operated responsive to the existence of a trouble condition in the equipment to which the relay is individual and an alarm apparatus unit for sounding different alarm codes, a different code for each type of equipment, said alarm apparatus unit comprising an electromagnetically actuated tone bar, an electromagnetically actuated bell, an interrupter, a series of alarm coding relays for operating said tone bar and bell to sound any one of the alarm codes or a plurality of said alarm codes depending upon whether one or more of said alarm relays is operated, means comprising said interrupter for cyclically operating said alarm coding relays in succession, a series of sets of control relays, one set for each different type of equipment, a first control relay of each set being operated whenever the alarm relay of the same equipment is operated, means comprising a first one of said alarm coding relays for actuating said tone bar at the beginning of each cycle of operation of said alarm coding relays, and means comprising said first relay of each set of control relays and said alarm coding relays for selectively actuating said bell one or more times following the actuation of said tone bar to identify in succession each equipment the alarm relay of which is operated.

8. In combination, a plurality of different types of equipment, a like plurality of different alarm codes, a plurality of alarm relays, each of said relays individual to a different type of equipment and each relay being operated responsive to the existence of a trouble condition in the equipment to which the relay is individual, and alarm apparatus units each individual to a different one of said alarm relays, each alarm apparatus unit comprising an electromagnetically actuated tone bar and an electromagnetically actuated code bell and a variably operable alarm coding relay unit, the operation of each of the alarm relays being effective to control the operation of the alarm coding unit of the alarm apparatus unit which is individual to the operated alarm relay to sound the corresponding one of said plurality of different alarm codes, each alarm code consisting of a stroke on the tone bar followed by one or more strokes on the code bell.

9. In combination, a plurality of different types of equipment, a like plurality of different alarm codes, a plurality of alarm relays, each of said relays individual to a different type of equipment and each relay being operated responsive to the existence of a trouble condition in the equipment to which the relay is individual, alarm apparatus units each individual to a different one of said alarm relays, each alarm apparatus unit comprising an electromagnetically actuated tone bar and an electromagnetically actuated code bell and a variably operable alarm coding relay unit, the operation of each of the alarm relays being effective to control the operation of the alarm coding unit of the alarm apparatus unit which is individual to the operated alarm relay to sound the corresponding one of said plurality of different alarm codes, each alarm code consisting of a stroke on the tone bar followed by one or more strokes on the code bell, and switching means for connecting a particular one of said alarm coding units to another one of said alarm coding units, whereby both units are rendered operatively responsive to the existence of a trouble condition in each of two types of equipment.

10. In combination, a plurality of different types of equipment, a like plurality of different alarm codes, a plurality of alarm relays, each of said relays individual to a different type of equipment and each relay being operated responsive to the existence of a trouble condition in the equipment to which the relay is individual, alarm apparatus units each individual to a different one of said alarm relays, each alarm apparatus unit comprising an electromagnetically actuated tone bar and an electromagnetically actuated code bell and a variably operable alarm coding relay unit, the operation of each of the alarm relays being effective to control the operation of the alarm coding unit of the alarm apparatus unit which is individual to the operated alarm relay to sound the corresponding one of said plurality of different alarm codes, each alarm code consisting of a stroke on the tone bar followed by one or more strokes on the code bell, and switching means for individually connecting a particular one of said alarm coding units to each of the other alarm coding units, whereby all of said coding units are rendered operatively responsive to all of said alarm relays which are simultaneously held operated responsive to a trouble condition in the equipment to which it is individual.

STANLEY T. SLEZAK.

REFERENCES CITED

The following references are of record in the file of this patent:

UNITED STATES PATENTS

| Number | Name | Date |
|---|---|---|
| 1,080,246 | Beach et al. | Dec. 2, 1913 |
| 1,337,753 | Clausen | Apr. 20, 1920 |
| 1,569,678 | Powell | Jan. 12, 1926 |
| 1,628,358 | Friendly | May 10, 1927 |
| 1,899,112 | Saunders | Feb. 28, 1933 |
| 1,912,450 | Hatton | June 6, 1933 |
| 1,950,108 | Harrington | Mar. 6, 1934 |
| 2,262,595 | Walters | Nov. 11, 1941 |
| 2,278,172 | Dimond | Mar. 31, 1942 |
| 2,292,183 | Wallace | Nov. 18, 1942 |
| 2,362,928 | Priessman | Nov. 14, 1944 |
| 2,372,022 | Schneckloth | Mar. 20, 1945 |